Nov. 21, 1961  P. LEMMERZ  3,009,501
WHEEL RIM FOR TUBELESS TIRES
Filed Aug. 1, 1956  2 Sheets-Sheet 1
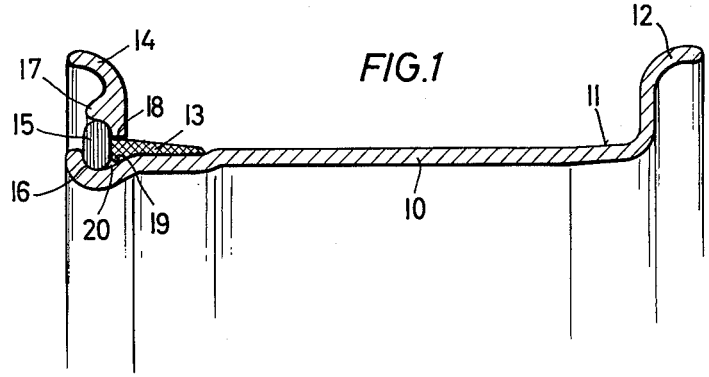
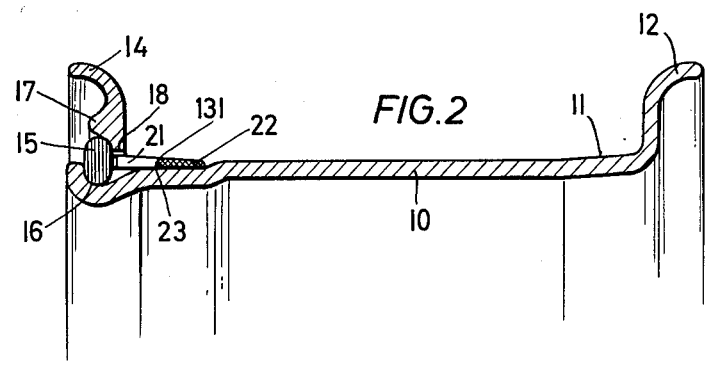
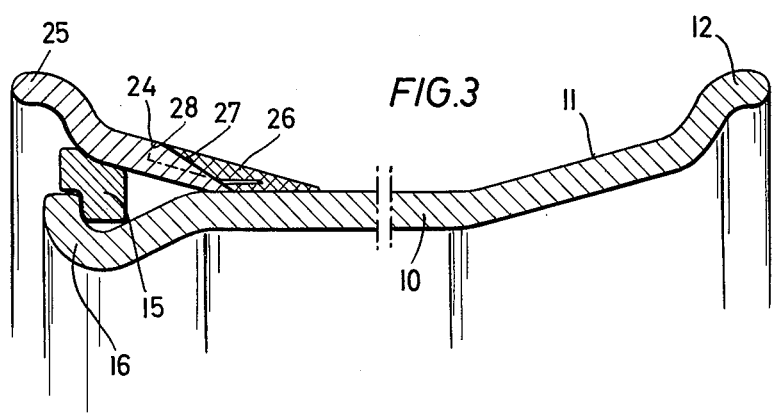
Inventor.
Paul Lemmerz.
By
Atty Nov. 21, 1961 P. LEMMERZ 3,009,501
WHEEL RIM FOR TUBELESS TIRES
Filed Aug. 1, 1956 2 Sheets-Sheet 2
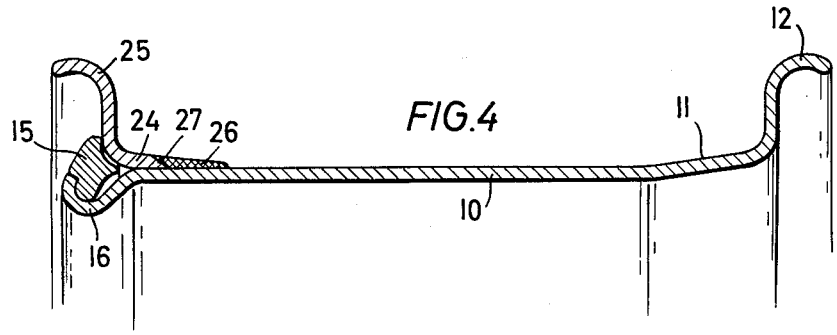
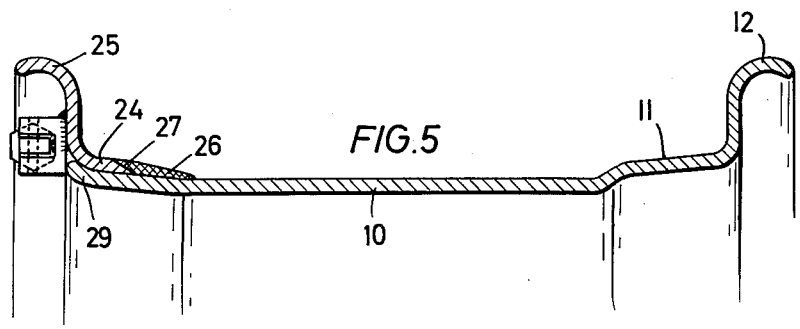
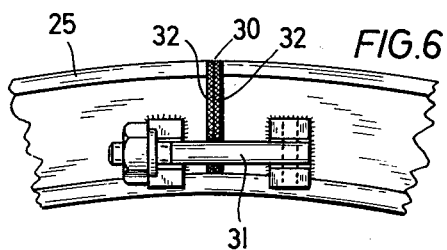
Inventor:
Paul Lemmerz.
By [signature] Atty

United States Patent Office 3,009,501
Patented Nov. 21, 1961

3,009,501
WHEEL RIM FOR TUBELESS TIRES
Paul Lemmerz, Heisterbacher Weg, Koenigswinter, Germany
Filed Aug. 1, 1956, Ser. No. 601,590
Claims priority, application Germany Aug. 6, 1955
11 Claims. (Cl. 152—410)

This invention is concerned with a wheel rim for tubeless tires having removable inclined shoulders for supporting tire beads and a removable side ring to facilitate the opening of the rim incident to changing tires.

In accordance with the invention, there is provided a ring forming an inclined supporting shoulder for a tire bead, such ring being made throughout its width or at least with the part thereof facing the central rim bed portion, of rubber or similar elastic material. The elastic ring may be formed as an endless ring or as a band having overlapping ends.

If the bed of the rim is limited on one side by three separate rings, namely, by an inclined shoulder ring, a side ring and a locking ring, the inclined ring forming the supporting shoulder will be made of rubber or similar elastic material. This ring may be cross-sectionally wedge-shaped. However, it may carry an inwardly directed enlargement entering into a notch which also receives the locking ring.

Instead of making the inclined shoulder ring wholly of rubber or the like, it may be made of two parts of substantially identical width, namely, of a part made of steel and another part made of elastic material. The elastic part is positioned so as to face the central portion of the rim bed. The two parts may be connected to form a unit, by vulcanizing or in similar suitable manner. The steel part may be provided with a number of radially directed slots formed therein; the rubber part may be uninterrupted throughout.

Instead of providing a separate inclined shoulder ring, it is possible to make the elastic inclined supporting shoulder with the side ring which limits the bed of the rim at one side, of one piece, and to connect the parts together, for example, by vulcanizing. In case the side ring is slotted, the abutting edges should be provided with rubber layers vulcanized thereto. The corresponding ends will then be in reliable airtight engagement. If the rubber ring which is vulcanized to the associated part should be provided with slots formed therein, its ends may overlap. The pressure of the tire bead acting upon the overlapping part will provide a reliable seal in spite of the slots. The slotted side ring may also be secured in closed position by a tightening screw.

Each of the above indicated embodiments of inclined shoulder rims may be used for a tubeless tire because one of the tire beads will be in absolutely airtight position with respect to the rim bed due to the action of the elastic inclined supporting shoulder.

If the elastic inclined supporting shoulder is fixedly connected, by vulcanizing, with other rim parts, for example, with a steel part of the inclined shoulder ring or with the side ring, it will be well to form the abutting edges so that they provide engaging surfaces as large as possible. This may be obtained by forming the engaging surfaces angular or oblique. There is also the possibility of providing the steel part with an angular recess formed therein, the rubber part entering into such recess.

The foregoing and other objects and features will appear from the description which is rendered below with reference to the accompanying drawings, in which FIG. 1 shows an arrangement for limiting the rim bed at one side thereof by an endless elastic inclined shoulder or ring and a relatively loosely mounted removable side ring;

FIG. 2 indicates a structure comprising an inclined shoulder ring made of a steel part and a rubber part;

FIG. 3 illustrates an arrangement comprising a removable side ring and a rubber ring vulcanized thereto and forming an inclined shoulder for a tire bead;

FIG. 4 shows for use with a structure according to FIG. 3 a somewhat differently profiled rim; and FIGS. 5 and 6 indicate a structure employing screw means for holding the removable side ring and the inclined shoulder ring in assembled position.

Identical references indicate identical parts throughout the drawings.

Referring now to the drawings, the rim bed 10 of FIG. 1 is limited on one side by a first integral inclined shoulder 11 and a similarly integrally connected first side flange 12. On the opposite side, there is disposed an endless ring 13 which is made of rubber or the like elastic material and forms a second inclined shoulder, and a removably disposed second side flange 14, which together with the bed 10 form a substantially symmetrical tire-receiving face. The two parts 13 and 14 are held in operating position by a locking ring 15 which may be a split ring. The latter extends resiliently radially inwardly into the gutter 16 of the rim bed and is held in its operative position by a protruding portion 17 formed on the side flange 14. The inclined shoulder ring 13 is supported in axial direction ahead of the locking ring 15 and is in radial direction embraced by a surface 18 of the side flange 14. An enlargement 19 of the ring 13 extends radially inwardly into an oblique portion of the gutter 16. It has been found, however, in practical tests, that the enlargement 19 may be omitted.

In FIG. 2, there is provided an inclined shoulder ring 131 which comprises a steel part 21 and a rubber part 22, vulcanized together at 23. The steel ring part 21 has a number of radially extending slots formed therein. The rubber ring 22 is solid throughout. In order to obtain at the abutting areas a connection as firm as possible, by the vulcanizing of the parts 21 and 22, the corresponding abutting surfaces are increased by angular formation thereof. It has been found that the narrow elastic part 22 of the inclined shoulder ring 131 suffices for obtaining the desired tight sealing for a tubeless tire.

In accordance with FIG. 3, the rim bed 10 is laterally limited along one side by the integral side flange 12 extending from the inclined shoulder part 11, as in FIGS. 1 and 2, and along the other side by a ring 24, 26 forming the inclined shoulder from which extends the other side flange 25. Numeral 15 indicates the locking ring, part of which extends into the gutter 16. The side flange 25 with the inclined shoulder 24, 26 is thus removable. The inclined shoulder is composed of part 24 and a rubber part 26 which is vulcanized thereto. While the inclined shoulder rings 13 and 131 of FIGS. 1 and 2 exhibit an incline of only about 5°, the incline of the ring portion 24, 26 is about 15°. In order to increase the areas of the abutting surfaces 27, these surfaces are cut at an angle. The rubber part 26 may however be joined with the steel part 24 by insertion thereof into a stepped recess as indicated at 28.

FIG. 4 shows an arrangement similar to FIG. 3 in connection with a somewhat differently profiled rim having shoulders inclined at an angle of about 5°.

According to FIGS. 5 and 6, the steel part 24 of the removable side flange 25 may be slotted and the elastic ring 26 may be solid throughout. The rim 29 of the bed which is somewhat extended outwardly serves for supporting the part 24 of the side flange. The abutting point 30 of the side profiles of parts 24, 25 is bridged by a tightening screw 31. The edges of the part 25 are provided with layers of rubber 32 so as to make the corresponding joint airtight.

Changes may be made within the scope and spirit of the appended claims.

I claim:

1. In a wheel rim assembly for mounting a pneumatic tire having peripheral mounting beads, said assembly having a substantially symmetrical tire-receiving face which is provided with oppositely disposed outwardly directed inclined bead-supporting shoulder portions and tire-retaining side portions defining the outermost portions of said tire-receiving face, said tire receiving face being formed in part by an annular rim bed, a ringlike member disposed at least at one side of said rim bed and defining at least a part of the inclined shoulder at the corresponding side thereof, said ringlike member having at least the inner part thereof made of elastic material, which inner part is spaced inwardly from the adjacent tire-retaining side portion and constituting in engagement with the face of the rim bed and the opposed peripheral edge of the bead of a tire an air-retaining seal, the corresponding tire-retaining side portion of said tire-receiving face comprising an annular side flange extending from said ringlike member, and locking means for removably securing said side flange and said ringlike member in position.

2. A wheel rim assembly according to claim 1, wherein said ringlike member and said side flange are disposed at one side of said rim bed, the inclined shoulder portion and the side flange forming the corresponding side portion at the opposite side of said rim bed being formed integrally with said rim bed.

3. A wheel rim assembly according to claim 1, wherein the part of said ringlike member which is made of elastic material is constructed in the form of an endless ring.

4. A wheel rim assembly according to claim 1, wherein the part of said ringlike member which is made of elastic material is constructed in the form of a band having overlapping ends.

5. A wheel rim assembly according to claim 1, comprising an enlargement carried by said elastic part for engagement with a groove formed in said rim bed.

6. A wheel rim assembly according to claim 1, comprising a steel part extending from the portion of said ringlike member which is made of elastic material.

7. A wheel rim assembly according to claim 1, comprising a steel part vulcanized to and extending from the portion of said ringlike member which is made of elastic material.

8. A wheel rim assembly according to claim 1, wherein said ringlike member and said tire-retaining side flange are vulcanized together to form a unitary part.

9. A wheel rim assembly according to claim 1, wherein said ringlike member and said tire-retaining side flange are vulcanized together to form a unitary part, the abutting edges of said ringlike member and said flange being lined with rubber layers vulcanized thereto.

10. A wheel rim assembly according to claim 1, wherein said ringlike member and said tire-retaining side flange are vulcanized together to form a unitary part, the ends of said ringlike member and said flange overlapping, one of such elements having slots formed therein.

11. A wheel rim assembly according to claim 1, wherein said ringlike member and said tire-retaining side flange are vulcanized together to form a unitary part, the ends of said ringlike member and said flange overlapping, one of such elements having slots formed therein, and a tightening screw for tightening said side ring.

References Cited in the file of this patent

UNITED STATES PATENTS

| | | |
|---|---|---|
| 2,700,999 | Lemmerz | Feb. 1, 1955 |
| 2,822,017 | Herzegh | Feb. 4, 1958 |
| 2,827,100 | Herzegh | Mar. 18, 1958 |

FOREIGN PATENTS

| | | |
|---|---|---|
| 691,981 | Great Britain | May 27, 1953 |
| 725,767 | Great Britain | Mar. 9, 1955 |
| 1,100,154 | France | Mar. 30, 1955 |

(Corresponding to U.S. Patent No. 2,906,315, Sept. 29, 1959)